United States Patent [19]

Farr

[11] Patent Number: 5,460,075
[45] Date of Patent: Oct. 24, 1995

[54] HYDRAULIC MASTER CYLINDER WITH ROTATABLE SLEEVE ACTUATED POPPET VALVES

[75] Inventor: Glyn P. R. Farr, Leek Wootton, United Kingdom

[73] Assignee: Lucas Industries Public Limited Company, Solihull, United Kingdom

[21] Appl. No.: 155,783

[22] Filed: Nov. 23, 1993

[30] Foreign Application Priority Data

Nov. 23, 1992 [GB] United Kingdom ............... 9224641

[51] Int. Cl.$^6$ ............................. F15B 9/10; B60T 13/20
[52] U.S. Cl. ................................. 91/380; 60/552
[58] Field of Search ...................... 60/591, 547.1, 60/552; 91/375 R, 380, 373, 376 R, 377, 374

[56] References Cited

U.S. PATENT DOCUMENTS

| | | | |
|---|---|---|---|
| 2,410,269 | 10/1946 | Chouings | 91/376 X |
| 2,931,180 | 4/1960 | Randol | 91/375 X |
| 3,683,619 | 8/1972 | Belart | 60/552 X |
| 3,827,242 | 8/1974 | Belart | 60/552 |
| 3,832,933 | 9/1974 | Jablonsky | 91/374 |
| 4,341,076 | 7/1982 | Steffes | 60/547.1 |
| 4,687,259 | 8/1987 | Reinartz et al. | 60/547.1 X |
| 5,351,600 | 10/1994 | Ishiwata | 60/547.1 X |

FOREIGN PATENT DOCUMENTS 1580125  11/1980  United Kingdom .

*Primary Examiner*—John E. Ryznic
*Attorney, Agent, or Firm*—Jacobson, Price, Holman & Stern

[57] ABSTRACT

A hydraulic master cylinder (1) comprises a body (2) in which conventional output chambers (5,6) are defined. In use, the output chambers are pressurized by a piston (4) which is moved by a combination of mechanical input force applied to an input member (8) and hydraulic pressure within a servo chamber (13) located to the rear of the piston (4). Connection of the servo chamber (13) to a pressure source is controlled by poppet valves (16, 17) which are opened as necessary by ribs (23, 24) of a sleeve (22) mounted on imput member (8). The sleeve (22) is coupled to the piston (4) but free to rotate relative to the input member (8) and is coupled to the input member by means of a helical groove and ball arrangement such that movement of the input member (8) towards the piston (4) causes rotation of the sleeve (22) to open the inlet valve (17), and movement of the input member (8) away from the piston (4) causes opposite rotation of the sleeve (22) to close the input valve (17) and open the outlet valve (18).

6 Claims, 3 Drawing Sheets

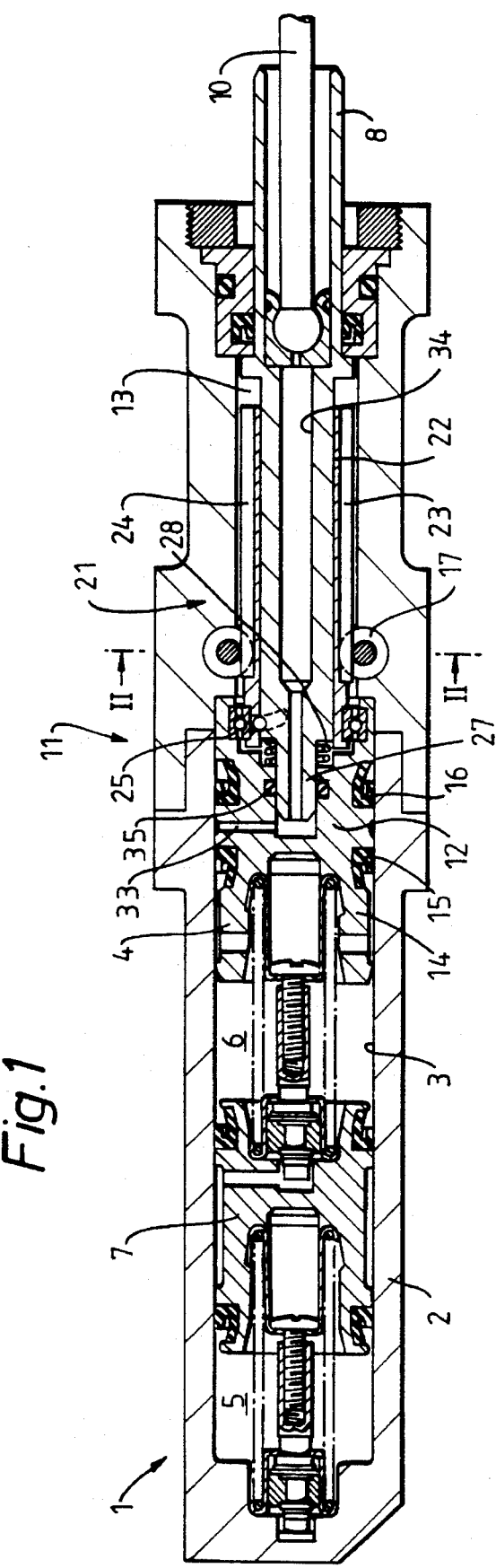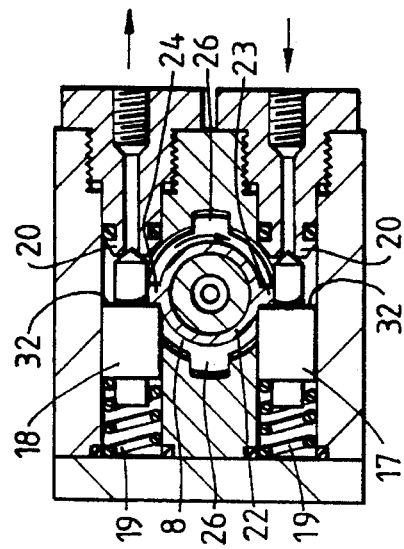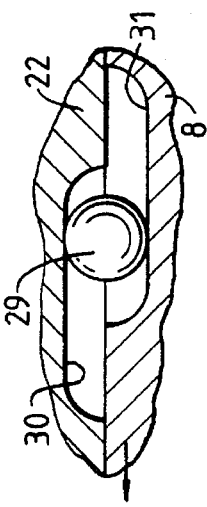
Fig.1
Fig.2
Fig.3

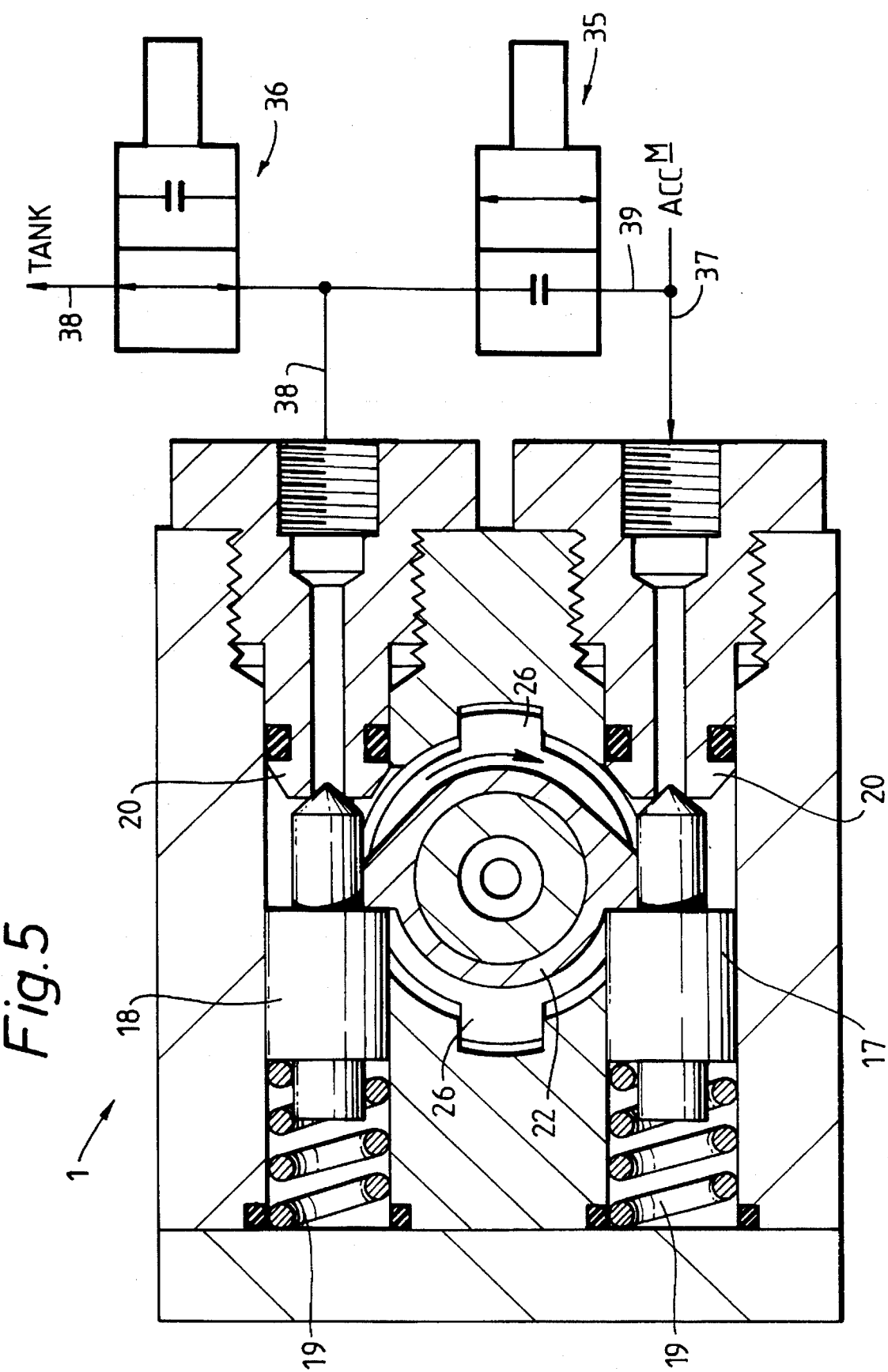

HYDRAULIC MASTER CYLINDER WITH ROTATABLE SLEEVE ACTUATED POPPET VALVES

This invention relates to a hydraulic master cylinder for a vehicle hydraulic system, comprising; a body having a bore; an output piston slidingly and sealingly mounted in the bore and displaceable in a working direction along the bore to pressurise at least one output chamber defined in the bore; an input member to which an operating force may be applied to urge the output piston in its working direction; and a servo mechanism for supplementing the force applied to the output piston by the input member, the servo mechanism comprising a servo chamber defined in the valve body such that pressurisation of the servo chamber urges the output piston in its working direction, at least one valve for controlling admission of working fluid to the servo chamber, and a control device for opening the valve in response to the application of an operating force to the input member.

A hydraulic master cylinder of this type is known from FIGS. 4 and 5 of GB-A-1580125. In this known device the valve for controlling the input and output of working fluid to the servo chamber is in the form of a spool valve. If, as would be usual in a motor vehicle, an accumulator is used to supply the working fluid, the spool valve must retain the pressure of the accumulator without substantial leakage. To achieve this the spool must be a very close fit in the housing, and both the housing and the spool must be machined to very close tolerances. This significantly adds to the cost of manufacture of the master cylinder.

Further, because of the very close fit of the spool in the housing, the spool is liable to seize in the housing under adverse conditions, for example at very low temperatures or after prolonged periods of non-use. If the spool seizes in its normal position the control device for opening the valve may be incapable for applying sufficient force to the valve to displace it into its open position. Under these circumstances, no servo assistance will be provided. In the alternative, if the valve seizes in its open position maximum accumulator pressure will be applied to the servo piston even if the brake pedal is released, with the result that brake pressure will rise to a level at which the wheels will lock. Either of these consequences is highly undesirable.

It will be noted that the problem of spool valve seizure is exacerbated by the fact that the control device of GB-A-1580125 is only capable of applying a force to the spool valve in the direction to open the accumulator connection and close the reservoir connection. The particular mechanism disclosed in GB-A-1580125 is incapable of applying a reverse force to the spool valve and accordingly a spring must be provided to urge the spool valve in the reverse direction. The control device must accordingly not only overcome friction in order to move the spool valve in the opening direction, but must also overcome the force of the return spring. It will of course be appreciated that the force of the return spring must be made substantial in order to reduce to the minimum the possibility of the spool seizing in the open position and this has an adverse affect at the brake pedal when brakes are to be gently applied.

Whilst the problem of spool seizure could be overcome if the spool valve of GB-A-1580125 were to be replaced by a pair of poppet valves—one controlling connection to the servo chamber to the accumulator and the other controlling connection of the servo chamber to reservoir—this would not be possible with the control device of GB-A-1580125 since that control device is only capable of providing an operating force in one direction, and would accordingly not be able to operate two separate poppet valves in a simple manner.

Accordingly, the present invention is characterised in that a first poppet valve is provided for controlling communication between the servo chamber and a source of working fluid; a second poppet valve is provided for controlling communication between the servo chamber and a reservoir; and the control device is operable to open the first poppet valve whilst allowing the second poppet valve to close in response to the application of an operating force to the input member and to open the second poppet valve whilst allowing the first poppet valve to close in response to removal of said operating force.

A simple spring loaded poppet valve capable of resisting accumulator pressure without significant leakage may readily be manufactured without the use of extremely close tolerances, and such valves are very resistant to seizing in the open position. Further, since both valves are positively moved in their respective opening directions by the control device (the first poppet valve during the application of an operating force and the second poppet valve during removal of that operating force) neither valve need rely on the use of a spring to effect opening and the possibility of the system failing in a manner which applies full accumulator pressure to the servo piston is obviated.

In a particularly preferred embodiment of the invention the control device comprises a sleeve which surrounds the input member and has respective projections for engaging the first and second poppet valves. Means are provided permitting limited axial movement of the input member relative to the sleeve upon application of an operating force to the input member, and means are provided between the sleeve and the input member for rotating the sleeve relative to the body in one direction upon application of an operating force to the input member and for rotating the sleeve relative to the body in the opposite direction upon removal of the operating force. The projections are arranged such that rotation of the sleeve relative to the body in the said one direction opens the first poppet valve, and rotation of the sleeve relative to the body in the opposite direction opens the second poppet valve.

The relative movement between the sleeve and the input member can conveniently be provided by securing the sleeve, in the axial direction, to the servo piston of the servo mechanism, and providing for axial movement of the input member relative to the servo piston upon application of an operating force.

In a particularly preferred embodiment of the invention, the means between the sleeve and the input member for effecting rotation of the sleeve relative to the input member comprises at least one pair of generally helically extending grooves, one groove being formed in the sleeve and the other groove being formed in the input member. Each pair of grooves preferably houses a ball. A spring is provided for biasing the input member axially relative to the sleeve such that the ball sits close to the end of the piston groove nearer the output piston and close to the end of the sleeve groove further from the output piston to define the rest position of the sleeve and the input member. Axial movement of the input member against the bias of the spring will accordingly cause the ball to roll along the respective grooves effecting rotation of the sleeve relative to the input member. The use of a ball in this manner eliminates the sliding friction which would be associated with the use of a peg in a helical groove or a screw thread connection between the sleeve and the input member and thereby maximises the force which the control device can apply to the poppet valves for a given level of operating force applied to the input member.

Preferably, the servo piston of the servo mechanism is integral with the output piston and the integral piston carries a pair of back-to-back seals, one for sealing the servo chamber and one for sealing the output chamber. In a particularly preferred embodiment of the invention the space between the seals is vented to the exterior of the master cylinder via a passage provided in the input member. This arrangement substantially reduces the required length of the master cylinder as compared with the arrangement of GB-A-1580125 in which the space between the output chamber seal and the servo chamber seal is vented directly to the master cylinder reservoir. This reduced length of master cylinder assists the vehicle design and reduces the weight of the master cylinder.

The invention will be better understood from the following description of a preferred embodiment thereof, given by way of example only, reference being had to the accompanying drawings wherein:

FIG. 1 is a schematic cross-sectional view of a preferred embodiment of the invention;

FIG. 2 is a schematic cross-section on the line II—II of FIG. 1;

FIG. 3 is a schematic developed view of one pair of helical grooves;

FIG. 5 showns schemativally a further embodiment of the invention.

Figure 4:
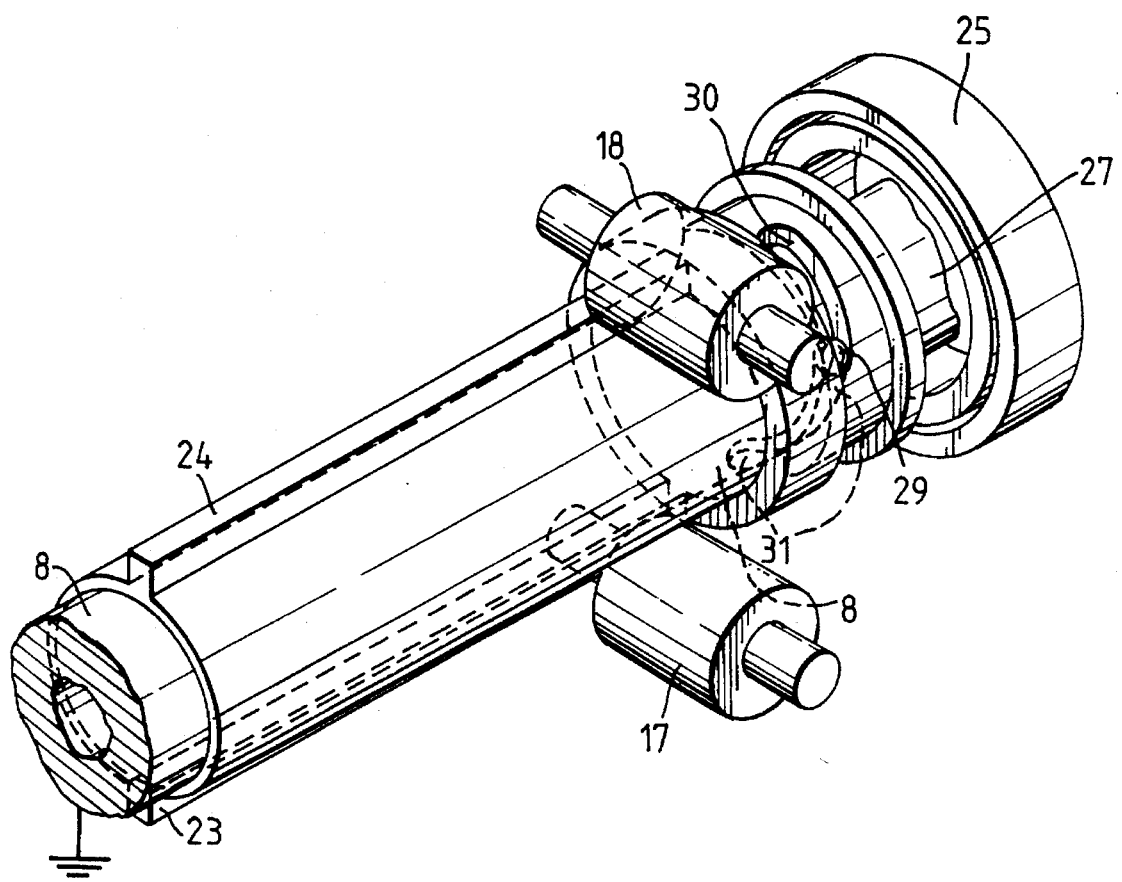
FIG. 4 is a schematic view partly broken away showing the relationship of the helical grooves of one pair to each other.

Referring firstly to FIG. 1, the illustrated hydraulic master cylinder 1 comprises a body 2 having a bore 3. An output piston 4 is slidably and sealingly mounted in the bore 3 and is displaceable along the bore in a working direction (to the left as viewed in FIG. 1) to pressurise output chambers 5, 6. The output chambers 5, 6 are separated by a piston 7 since the master cylinder is of the tandem type. Appropriate output and reservoir connections are provided for the output chambers 5, 6 as will be appreciated by those skilled in the art. However, the exact form of the hydraulic arrangements on the output side of the master cylinder are not relevant to the present invention, and will not be described herein in detail.

An input member 8 is provided for receiving an operating force from input rod 10. The input rod 10 will, in use, be connected to a member, e.g. a brake pedal, engageable by a user of the vehicle to which the hydraulic master cylinder is fitted.

A servo mechanism 11 comprising a servo piston 12 and a servo chamber 13 is provided for supplementing the force which, in normal use of the invention is applied to the output piston by the input member. In the illustrated embodiment of the invention the servo piston 12 is integral with the output piston 4, the two pistons being constituted by a unitary body 14 upon which a main seal 15 exposed to the chamber 6 and a servo seal 16 exposed to the chamber 13 are provided. When pressurised working fluid is admitted to the servo chamber 13 the fluid pressure acts on the servo piston 12 to urge the output piston 4 in the working direction to pressurise the chambers 5 and 6.

The connection of the servo chamber 13 to a source of working fluid, for example an accumulator, is controlled by a first poppet valve 17, and the connection of the servo chamber 13 to a reservoir is controlled by a second poppet valve 18. As illustrated in FIG. 2, each poppet valve comprises a valve member normally urged by an associated spring 19 into engagement with a respective seat 20. The form of the poppet valves 17, 18 is such that they can readily be manufactured and are well able to resist both accumulator pressure and servo chamber pressure without leakage.

In use, opening and closing of the poppet valves 17, 18 is controlled by a control device 21. The control device 21 comprises a sleeve 22 mounted on the input member 8 and provided with a pair of longitudinally extending projections 23, 24 capable of engaging and opening the poppet valves 17, 18 respectively. The sleeve 22 is secured to the servo piston 12 by means of a bearing 25 which permits free rotation of the sleeve relative to the servo piston, but prevents axial movement of the sleeve relative to the servo piston.

The input member 8 is provided with projections 26 which engage in corresponding flots formed in the body to prevent rotation of the input member relative to the body. The forward end 27 of the input member 8 is received in a bore provided in the servo piston in a manner which permits limited relative axial movement of the input member relative to the servo piston 12. A spring 28 biases the servo piston and input member in opposite directions.

The sleeve 22 and input member 8 are interconnected by at least one ball 29 which engages a pair of grooves 30, 31, one groove (30) being formed in the sleeve 22 and the other groove (31) being formed in the input member. The groove are orientated as illustrated in FIG. 4—that is the grooves are generally in end-to-end relationship when the sleeve and input member are in their rest position with the ball 29 resting near the end of the groove 30 further from the output piston 4 and near the end of the groove 31 which is nearer to the output piston 4.

In use, when the vehicle driver wishes to pressurise the output chambers 5, 6 the associated control is operated (e.g. the brake pedal in the case where the master cylinder is used as part of a braking circuit) to apply an axial force to the rod 10. This operating force is applied by the rod 10 to the input member 8 which in turn transfers the force to the servo piston 12, in part via the spring 28, and in part via the ball 29 and grooves 30, 31. The force applied to the servo piston is in turn transferred to the output piston 4 and moves the output piston in the direction of its working stroke to begin pressurisation of the chambers 5, 6. The axial force transferred from the input member 8 to the sleeve 22 by the balls 29 will produce a torque tending to rotate the sleeve 22 relative to the input member in the clockwise direction as viewed in FIG. 2. At a relatively small level of operating force applied to the input member 8 this torque will be sufficient to overcome the friction associated with the ball and groove arrangements 30, 31 and the force of the spring 19 associated with the poppet valve 17, and accordingly the sleeve 22 will rotate to close the valve 18 and lift the poppet valve 17 from its seat 20 and admit fluid from the pressure source (typically an accumulator) to the servo chamber 13. Pressure of the chamber 13 acting on the servo piston 12 will supplement the force applied to the servo piston 12 and assist pressurisation of the output chambers 5, 6. As the piston assembly 4, 12, input member 8 and sleeve 22 advance along the bore 3 of the master cylinder body the projection 23 will slide along the shoulder 32 of the poppet valve 17.

When the required degree of pressurisation of the output chambers 5, 6 has been achieved the operator of the vehicle will cease further depression of the brake pedal or the like and will effectively hold the input rod 10 at a fixed position relative to the body 2. When this occurs, there will be slight further forward movement of the servo piston 12, output piston 4 and sleeve 22 as a result of continued admission of pressurised fluid from the fluid source. The forward movement of the sleeve 22 will not be accompanied by corresponding forward movement of the input member 8, and accordingly the ball and groove arrangements 29-31 will operate to rotate the sleeve relative to the input member in the anti-clockwise direction as viewed in FIG. 2 until the first poppet valve 17 closes. The various components will remain in the resultant static configuration until there is further movement of the input rod 10. Further depression of the input rod 10 to increase the pressure in the chambers 5, 6 will repeat the sequence described above. Rearward movement of the output rod 10 will allow the input member 8 to move to the right as viewed in FIG. 1 under the influence of the fluid pressure acting upon the input member 8 and the spring 28 which will cause anti-clockwise (as viewed in FIG. 2) rotation of the sleeve 22 relative to the input member 8 thereby causing the projection 24 to engage the shoulder 32 of poppet valve 18 and lift that valve to connect the servo chamber 13 to reservoir. As a result, pressure can bleed from the servo chamber 13 and pressure in the output chambers 5, 6 will be correspondingly reduced.

Whilst the illustrated ball and helical groove arrangement is the presently preferred arrangement for producing the required rotation of the sleeve 22, any arrangement capable of producing positive rotation of the sleeve in one direction during forward movement of the input member and in the opposite direction during rearward movement of the input member may be utilised. For example, a buttress thread arrangement may be suitable under certain circumstances.

Referring again to FIG. 1, it will be noted that the axial spacing between the servo seal 16 and the output chamber seal 15 in the illustrated embodiment is considerably less than the corresponding spacing between the seals of FIG. 4 of GB-A-1580125. The space between the seals of the servo chamber and the output chamber serves to add to the overall length of the master cylinder and performs no useful function. Hence, it is desirable for this spacing to be as small as possible both to reduce the overall length of the master cylinder and thereby reduce installation difficulties, and to reduce the weight of the master cylinder. In the case of GB-A-1580125 the large spacing is necessary because the space between the servo chamber seal and the output chamber seal is vented to the reservoir connection. In the case of the illustrated embodiment of the present invention the space between the seals 15 and 16 is vented via a radial passage 33 formed in the body 14 and an axial passage 34 formed in the input member 8. An O-ring seal 35 is provided between the body 14 and the forward end 27 of the input member 8 in order to seal the servo chamber 13 at this point.

If the fluid used for the servo unit is not compatible with that used in the braking circuit, the space between the two seals 15 and 16 must be at least one full stroke of the master cylinder apart to prevent seal contamination. For this version the O-ring 35, the forward end of the input member 27 and the central passage 34 can be eliminated.

The above described embodiment of the invention is particularly useful in a braking system which requires provision for automatic application of the brakes. Such requirement may exist in the case of a vehicle fitted with an intelligent cruise control, brake intervention as part of a traction control system, or a collision avoidance system. The above described master cylinder may be utilised in such a system simply by the addition of a pair of solenoid valves 35, 36 as illustrated in FIG. 5. Solenoid valve 35 is of a normally closed type and is positioned in a passage which interconnects the accumulator supply line 37 and the tank return line 38 of the valve 1. Valve 36 is of the normally open type and is positioned within the tank return line 38.

When automatic braking is called for by the relevant system (usually via an electronic processor unit) the normally open valve 36 is shifted to its closed position and the normally closed valve 35 is shifted to its open position. The valve 35 may be fully opened or may be pulsed open depending on the nature of the automatic braking required. With the valve 36 closed, opening of the valve 35 will allow fluid from the accumulator supply line 37 to pass through the branch passage 39 to the second (return) poppet valve 18. Since in normal operation the valve 18 is biassed into the closed position by fluid pressure within the master cylinder body the spring 19 associated with the valve 18 need only be relatively light and accordingly if accumulator pressure is applied to this valve via the return line 38 the valve will unseat to admit accumulator pressure to the master cylinder body. This will pressurize the servo chamber 13 and drive the piston 4 forward to pressurize the braking circuits.

When the relevant control system senses that the brakes have been applied to a sufficient extent the accumulator valve 35 is closed to maintain the required pressure within the servo chamber 13. Should the pressure need to be decreased the valve 36 is automatically opened (either fully or in a pulsed manner) to reduce the pressure within the servo chamber 13.

If, during automatic operation, the driver applies the brakes by depressing the brake pedal the valves 35, 36 will automatically be returned to their normal positions (i.e. valve 35 closed and valve 36 open) and braking will be entirely under driver control.

The above described arrangement has the particular advantage that surplus fluid is not introduced into the braking circuits when automatic braking is required. In other words, automatic brake application is effected by operation of the master cylinder rather than the introduction of fluid into the braking system from some other source. This ensures that no damage to the rubber recuperation valves can occur should anti-lock operation immediate follow an automatic application of the brakes. As will be appreciated by those skilled in the art, damage to the seals can occur with anti-lock systems of the type where fluid dumped into an expansion chamber is pumped back into the master cylinder. If surplus fluid already in the brake system is dumped into an expander at the same time as the brakes are applied, the recuperation valve may have to open against a high pressure.

I claim:

1. A hydraulic master cylinder for a vehicle hydraulic system, comprising; a body having a bore; an output piston slidingly and sealingly mounted in the bore and displaceable in a working direction along the bore to pressurize at least one output chamber defined in the bore; an input member to which an operating force may be applied to urge the output piston in its working direction; and a servo mechanism for supplementing the force applied to the output piston by the input member, the servo mechanism comprising a servo chamber defined in the valve body such that pressurization of the servo chamber urges the output piston in its working direction, at least one valve for controlling admission of working fluid to the servo chamber, and a control device for opening the valve in response to the application of an operating force to the input member, characterized in that a first poppet valve is provided for controlling communication between the servo chamber and a source of working fluid; a second poppet valve is provided for controlling communication between the servo chamber and a reservoir; and the control device is operable to open the first poppet valve whilst allowing the second poppet valve to close in response to the application of an operating force to the input member and to open the second poppet valve whilst allowing the first poppet valve to close in response to removal of said operating force; the control device comprises a sleeve which surrounds the input member and has respective projections for engaging the first and second poppet valves; means for permitting limited axial movement of the input member relative to the sleeve upon application of an operating force to the input member; and means between the sleeve and the input member for rotating the sleeve relative to the body in one direction upon application of an operating force to the input member and for rotating the sleeve relative to the body in the opposite direction upon removal of the operating force.

2. A hydraulic master cylinder according to claim 1 wherein, the sleeve in secured, in the axial direction, to the servo piston of the servo mechanism, and the input member can move axially relative to the servo piston upon application of an operating force.

3. A hydraulic master cylinder according to claim 1 wherein the means between the sleeve and the input member for effecting rotation of the sleeve relative to the input member comprises at least one pair of generally helically extending grooves, one groove being formed in the sleeve and the other groove being formed in the input member, and a ball housed by the grooves.

4. A hydraulic master cylinder according to claim 3 wherein a spring is provided for biasing the input member axially relative to the sleeve such that the ball sits close to the end of the piston groove nearer the output piston and close to the end of the sleeve groove further from the output piston to define the rest position of the sleeve and the input member.

5. A hydraulic master cylinder according to claim 1 wherein the servo piston of the servo mechanism is integral with the output piston and the integral piston carries a pair of back-to-back seals, one for sealing the servo chamber and one for sealing the output chamber.

6. A hydraulic master cylinder according to claim 5 wherein the space between the seals is vented to the exterior of the master cylinder via a passage provided in the input member.

* * * * *